US007454544B2

(12) United States Patent
Bond et al.

(10) Patent No.: US 7,454,544 B2
(45) Date of Patent: Nov. 18, 2008

(54) INPUT/OUTPUT INTERFACE AND DEVICE ABSTRACTION

(75) Inventors: Anthony Wayne Bond, Tucson, AZ (US); Ronald Edward Mach, Las Vegas, NV (US)

(73) Assignee: Aristocrat Technologies Australia Pty Limited, Lane Cove, NSW (AU)

( * ) Notice: Subject to any disclaimer, the term of this patent is extended or adjusted under 35 U.S.C. 154(b) by 0 days.

(21) Appl. No.: 11/059,925

(22) Filed: Feb. 17, 2005
(Under 37 CFR 1.47)

(65) Prior Publication Data

US 2005/0159203 A1 Jul. 21, 2005

Related U.S. Application Data

(63) Continuation of application No. 09/743,950, filed on Jul. 28, 2003, now Pat. No. 6,968,405.

(60) Provisional application No. 60/094,068, filed on Jul. 24, 1998.

(51) Int. Cl.

| | |
|---|---|
| ***G06F 13/00*** | (2006.01) |
| ***G06F 3/00*** | (2006.01) |
| ***G06F 5/00*** | (2006.01) |
| ***G06F 9/44*** | (2006.01) |
| ***G06F 17/00*** | (2006.01) |
| ***G06F 19/00*** | (2006.01) |

(52) U.S. Cl. ..................... 710/64; 710/1; 710/2; 710/5; 710/8; 710/62; 710/63; 710/72; 710/73; 710/74; 710/104; 710/305; 710/306; 710/311; 719/321; 719/322; 719/324; 719/327; 463/1

(58) Field of Classification Search ....................... None
See application file for complete search history.

(56) References Cited

U.S. PATENT DOCUMENTS 4,079,452 A * 3/1978 Larson et al. ................. 710/11

(Continued)

FOREIGN PATENT DOCUMENTS

WO WO 99/60498 * 11/1999

OTHER PUBLICATIONS htpp: www.pcwebopedia.com/TERM/i/interface.html, no date.*

(Continued)

*Primary Examiner*—Tanh Q Nguyen
(74) *Attorney, Agent, or Firm*—Lawrence M. Jarvis; McAndrews, Held & Malloy, Ltd.

(57) ABSTRACT

An electronic Input/Output Interface and device abstraction system used in gaming machines includes: a game central processing unit (game "CPU"); an intelligent input/output controller board ("IOCB"); an Industry Standard Architecture PC bus ("ISA" bus); and a framed message transport protocol. The IOCB facilitates communications between the game CPU and virtual device services, which are peripheral devices associated with the gaming system. The game CPU communicates to gaming peripherals by sending virtual device messages across the ISA bus to the IOCB. The IOCB routes virtual device messages to appropriate virtual device services. Virtual device services are responsible for handling specific hardware, and include virtual device drivers on the game CPU that communicate with virtual devices on the IOCB. Use of the IOCB and the high speed interface enables the game CPU to use more of its available functions for controlling gaming functions rather than one operation of its associated peripheral devices.

22 Claims, 8 Drawing Sheets

U.S. PATENT DOCUMENTS

| | | | | | |
|---|---|---|---|---|---|
| 4,855,905 | A | * | 8/1989 | Estrada et al. | 709/246 |
| 5,274,765 | A | * | 12/1993 | Le Gallo | 710/64 |
| 5,759,102 | A | * | 6/1998 | Pease et al. | 463/42 |
| 5,767,430 | A | * | 6/1998 | Yamanoue et al. | 84/602 |
| 5,887,145 | A | * | 3/1999 | Harari et al. | 710/301 |
| 5,887,169 | A | * | 3/1999 | Lacombe | 719/311 |
| 5,926,175 | A | * | 7/1999 | Sturgeon et al. | 715/716 |
| 6,011,486 | A | * | 1/2000 | Casey | 340/7.29 |
| 6,053,814 | A | * | 4/2000 | Pchenitchnikov et al. | 463/36 |
| 6,071,190 | A | | 6/2000 | Weiss et al. | |
| 6,077,163 | A | * | 6/2000 | Walker et al. | 463/26 |
| 6,081,879 | A | * | 6/2000 | Arnott | 711/173 |
| 6,364,769 | B1 | | 4/2002 | Weiss et al. | |
| 6,682,423 | B2 | | 1/2004 | Brosnan et al. | |
| 6,805,634 | B1 | | 10/2004 | Wells et al. | |

OTHER PUBLICATIONS htpp: www.pcwebopedia.com/TERM/i/ISA.html, no date.*
Microsoft Press Computer Dictionary—Second Edition—1993, pp. 222-223.*

* cited by examiner

INPUT/OUTPUT INTERFACE AND DEVICE ABSTRACTION

The present application is a continuation of, and claims priority from, U.S. patent application Ser. No. 09/743,950, filed on Jul. 28, 2003 and issued as U.S. Pat. No. 6,968,405 on Nov. 22, 2005, which claims the benefit of provisional application No. 60/094,068, filed Jul. 24, 1998.

FIELD OF THE INVENTION

The present invention is a means for communication between a central processing unit ("CPU" or microprocessor) and an input/output control board, for controlling peripheral devices associated with a gaming machine.

BACKGROUND OF THE INVENTION

Historically, gaming machines have always been monolithic. That is, they have a single Central Processing Unit (CPU) running a single block of software that controlled all the hardware directly. Some hardware devices have a micro-controller in them to perform tasks for an explicit hardware function, but the game CPU to hardware interface is still monolithic in nature. An example of two smart devices that are controlled by the single game CPU are the following: U.S. Pat. No. 5,190,495 (Taxon, and assigned to Bally Manufacturing Corp.) for a high capacity coin hopper (a "super hopper") for a gaming machine which uses a micro-controller, but still has traditional control lines as if it were a non-intelligent hopper and U.S. Pat. No. 5,420,406 to Izawa et. al and assigned to Japan Cash Machines which discloses a bill acceptor, which requires a micro-controller to perform the operation of validating currency, but is interfaced via a dedicated serial port. The software to talk to these hardware devices would, generally, always be included in the software block that runs on the game CPU, whether or not that device was connected to the game. This static approach affects the CPU layout, since the Input/Output (I/O) is included on the CPU board, and it affects the design of the software that runs on the CPU. The resulting method of integrating the software to the hardware on a monolithic (or stand alone) CPU makes the software monolithic, harder to add new interfaces to hardware, and harder to maintain existing software.

If an extra level of intelligence could be added to the hardware devices of the gaming machine, the game CPU could dedicate more time running the game software and less time interfacing to the hardware. Using an Input/Output Control Board (IOCB) makes the game CPU a common part, since changes to the attached hardware do not affect the game CPU board. The structure of the Input/Output Control Board and its interactions with the gaming machine's CPU and the peripheral devices associated with the gaming machine are disclosed in Aristocrat's PCT Patent application, No. PCT/AU99/00373 for an Input/Output Control System. As disclosed, the microprocessor of IOCB, in conjunction with the CPU of the gaming machine, controls the operation of the gaming peripherals. Revisions to the gaming software and additional peripheral devices, are controlled using the IOCB. The IOCB thus provides the extra level of intelligence to the gaming machine, provided there are reliable communication between the IOCB and the game CPU.

The present invention describes communications between the game CPU and the IOCB. A factor in establishing reliable communications between the game CPU and the IOCB is having properly abstracted hardware to allow the software on the game CPU to adapt and correspond to new hardware arrangements with fewer changes to the game CPU hardware and software. The present invention further describes the hardware abstraction protocol.

It is an object of the present invention to provide an interface to enable communication between the central processing unit (CPU) of a gaming machine and an input/output control board (IOCB), for controlling peripheral devices associated with the gaming machine.

Another object of the present invention is to provide a communications protocol for bidirectional communication between the CPU of a gaming machine and an input/output control board.

Yet another object of the present invention is to provide a communications protocol that can determine whether the game CPU is in communication with the IOCB before a communication is sent between them.

Still another object of the present invention is to provide a communications protocol that includes a means of identifying the recipient of the communication.

Another object of the present invention is to provide a communications protocol that includes a means of sequentially numbering the transmissions.

Still another object of the present invention is to provide a communications protocol that contains a virtual device message.

Another object of the present invention is to provide a communications protocol that includes a means to validate the communication and verify the integrity of the communication.

Still another object of the present invention is to provide a means to store program codes for the peripheral devices associated with the gaming machine within the input/output control board, the process being referred to as abstraction.

Yet another object of the present invention is to provide a means to store hardware codes for the peripheral devices associated with the gaming machine within memory means of the input/output control board.

Still another object of the present invention is to provide a means to store communication codes for communicating with the peripheral devices associated with the gaming machine within memory means of the input/output control board.

Yet another object of the present invention is to provide a means to store meta-commands for the control of specific hardware devices.

SUMMARY OF THE INVENTION

These and other objects of the invention, which shall become hereafter apparent, are achieved by the present invention, which involves a high speed serial interface that enables communication between the central processing unit (CPU) of a system of playing games of skill or chance or entertainment (a gaming machine) and an input/output control board (IOCB) for controlling peripheral devices associated with the gaming machine. The interface has either an Industry Standard Architecture (ISA) bus, a Universal Serial Bus (USB) or the IEEE 1394 FIREWIRE™ bus. The IOCB facilitates the communications between the game CPU and the peripheral devices. These peripheral devices can be one or more of the following: for example, displays, buttons, coin hoppers, coin mechanisms, bill validators, reel mechanisms, etc., as known to those skilled in the art. Communication with the game CPU is bi-directional, and can occur simultaneously. Communication uses a framed message transport protocol, which includes a message header, a body containing a virtual device message and a packet validation signature. The message header identifies the intended recipient of the message. The body includes the message for the recipient. The packet validation signature includes a termination code and a means for checking if errors have occurred in the transmission. The game CPU communicates to the gaming peripheral devices by sending the device messages across the ISA bus to the IOCB. The IOCB then routes the device messages to the appropriate device. Use of the IOCB and the high speed interface enables the game CPU to use more of its available functions for controlling gaming functions rather than the operation of its associated peripheral devices.

BRIEF DESCRIPTION OF THE DRAWINGS

The invention will be better understood by a Detailed Description of the Invention, with reference to the following drawings, of which.

DETAILED DESCRIPTION OF THE PREFERRED EMBODIMENTS

Figure 1:
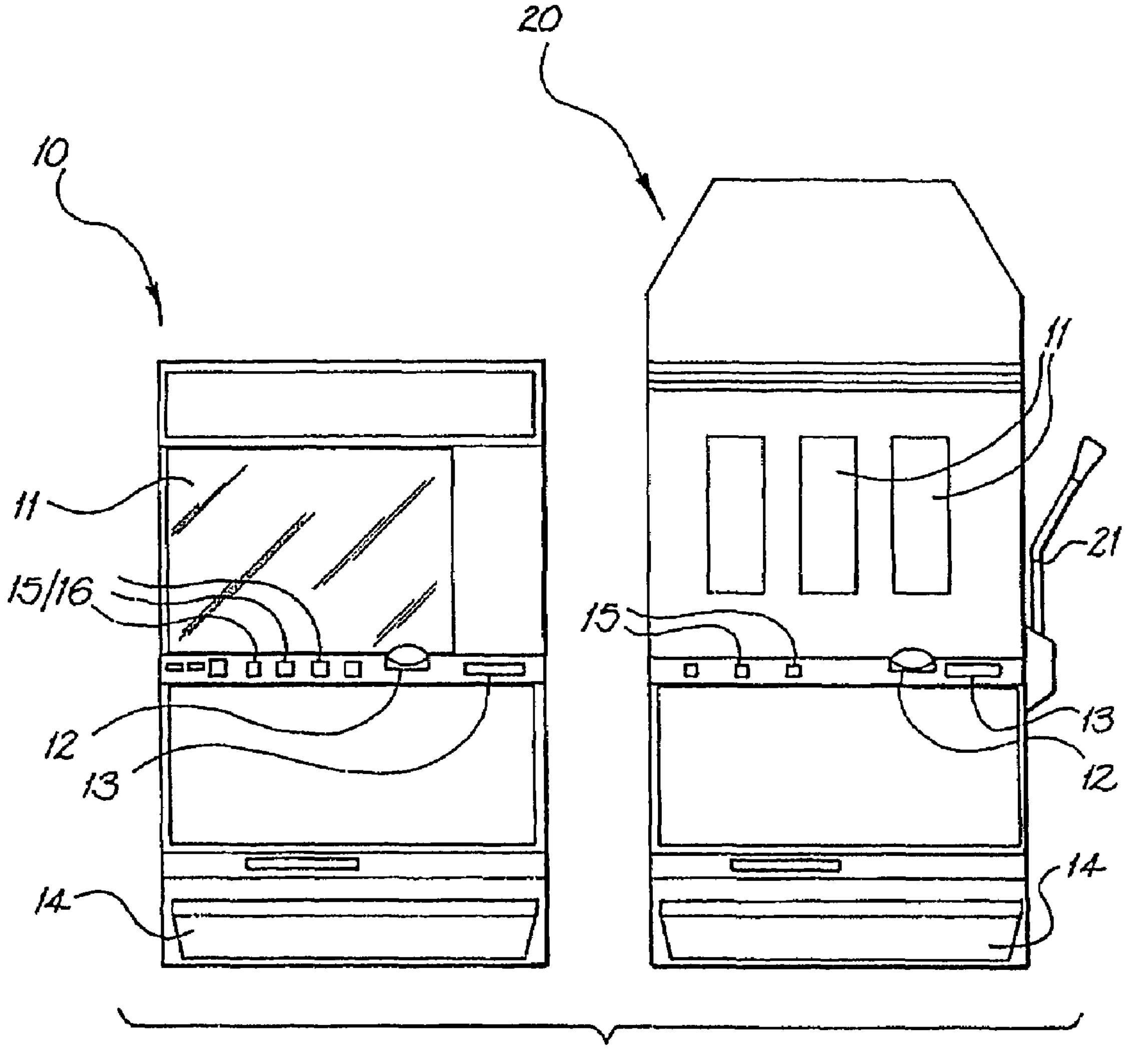
FIG. 1 illustrates two standard gaming devices (i.e., Video Poker and Reel Slot) in which the present invention can be applied.

An intelligent input/output control board ("IOCB", "control board") is designed to work in conjunction with gaming machines, such as the video poker machine 10 or slot machine 20 shown in FIG. 1. As will be described below, each of these machines contains a microcomputer board 30 (not shown in FIG. 1) which contains the instructions for operating the games i.e., the game software. As shown in FIG. 1, elements common to these machines include a display 11, a coin slot 12, a bill or card (credit card, debit card, other forms of electronic media) acceptor slot 13, a coin hopper/receptacle 14, a plurality of game buttons 15 which may contain lights 16 therein. Each gaming machine offers several ways in which the game player can deposit moneys into the machine, receive change where appropriate, in order to place bets on the conclusion of the particular game or games. In the case of slot machine 20, a handle 21 is present which can be used to operate the machine. The game buttons, lights and handles offer a means of allowing the player to interact with the gaming device, with the possibility of affecting the game conclusion. Mechanical and electrical components of these machines known to those skilled in the art are not illustrated. Included among the known functions of these gaming machines are the ability of the game to generate a random conclusion, and to offer a variable return play based upon a particular game conclusion and the game conclusions of other gaming devices with which a particular gaming device may be networked. Also, these gaming devices have the ability to vary the payout, such as paying a progressive jackpot which provides an additional return payout based upon the history of the various game conclusions prior to a particular individual's playing of the game, whether on a specific gaming machine or from one or more gaming machines networked to the specific gaming machine being played. These gaming devices also generate a variety of audio and visual effects, both during game play and between game play. Some other components, known to those skilled in the art and not shown in the drawings, include bells, reel mechanisms, dice mechanisms, wheel mechanisms and feature displays. In addition to their use for playing games of chance, these machines can also be used for playing games of skill, or for entertainment purposes.

For the purposes of this specification, the term "gaming machine" or "gaming device" will be reference numeral 10, and will refer to either of the machines shown in FIG. 1 or similar machines for playing games of chance, skill or entertainment.

The Main Game Processor and Software Systems

Figure 2:
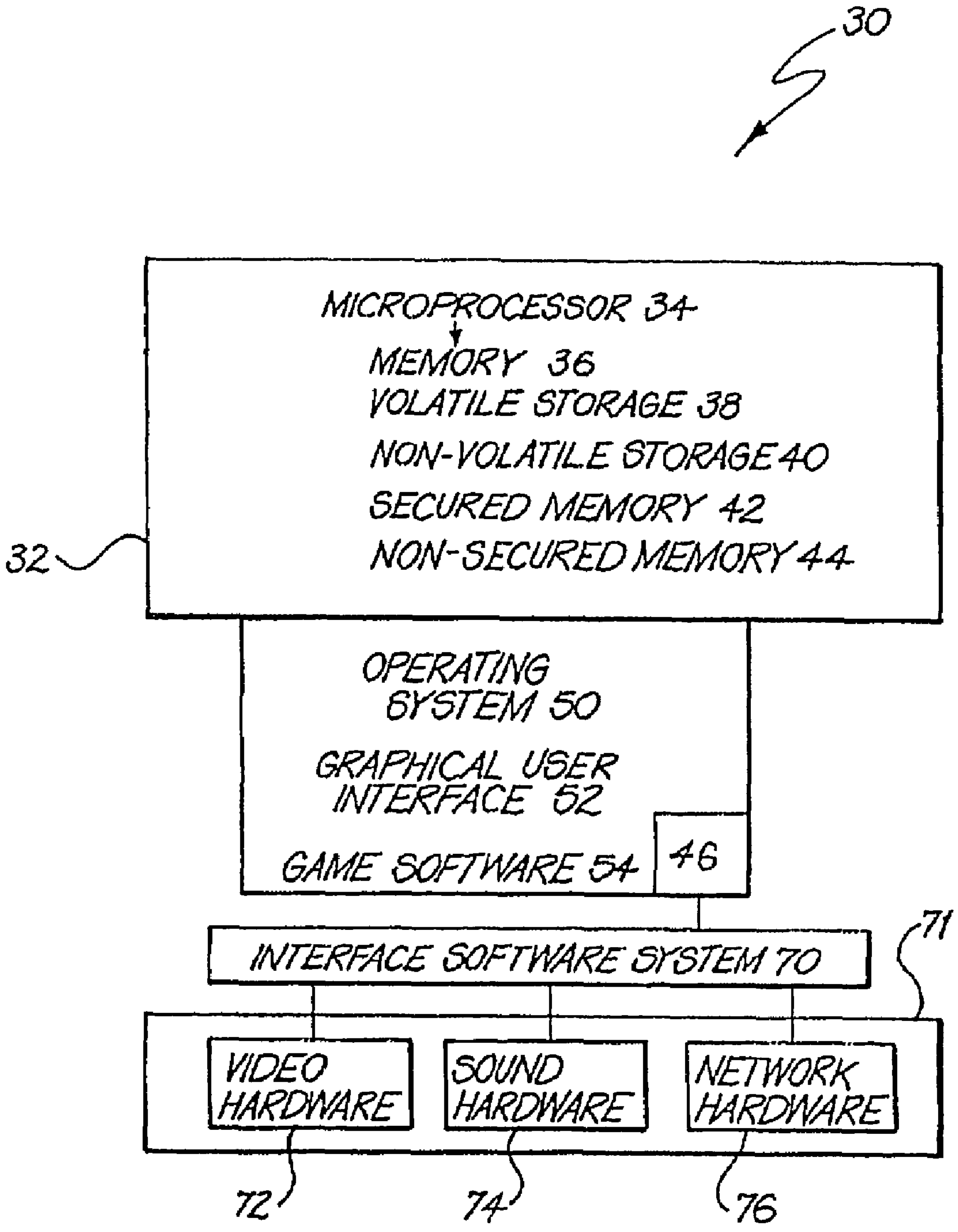
FIG. 2 illustrates the organisation of the microcomputer board; and the game, operating system, and graphical user interface software functions.

The main game processor 30 system (FIG. 2) described in the present invention is predicated on using an industry standard microcomputer board (MCB) 32 with a standard operating system (OS) 50 combined with a graphical user interface (GUI) 52 (FIG. 2). The MCB 32 has a central processing unit (CPU or microprocessor) 34, (also referred to as the game CPU), memory means 36 including volatile storage means 38 and non-volatile storage means 40, secured memory storage means 42 and nonsecured memory storage means 44. As shown schematically in FIG. 2, operating system 50 and GUI 52 are in communication with appropriate game software 54, with the OS 50, GUI 52 and game software 54 in communication with each other and the game CPU 34. This standardized hardware architecture and OS approach is used for three unique reasons:

(1) the platform can utilise the built-in multi-media and networking functions of the OS 50 and GUI 52;

(2) the electrical interface 46 to the system is an industry standard for which systems and peripheral devices are readily available; and (3) it utilises an interface software system 70 for control of its on-board peripheral devices. The interface software system 70 is described in greater detail in Alistocrat's PCT Patent Application No. PCT/AU99/00500, for a Method of linking devices to gaming machines.

Figure 3:
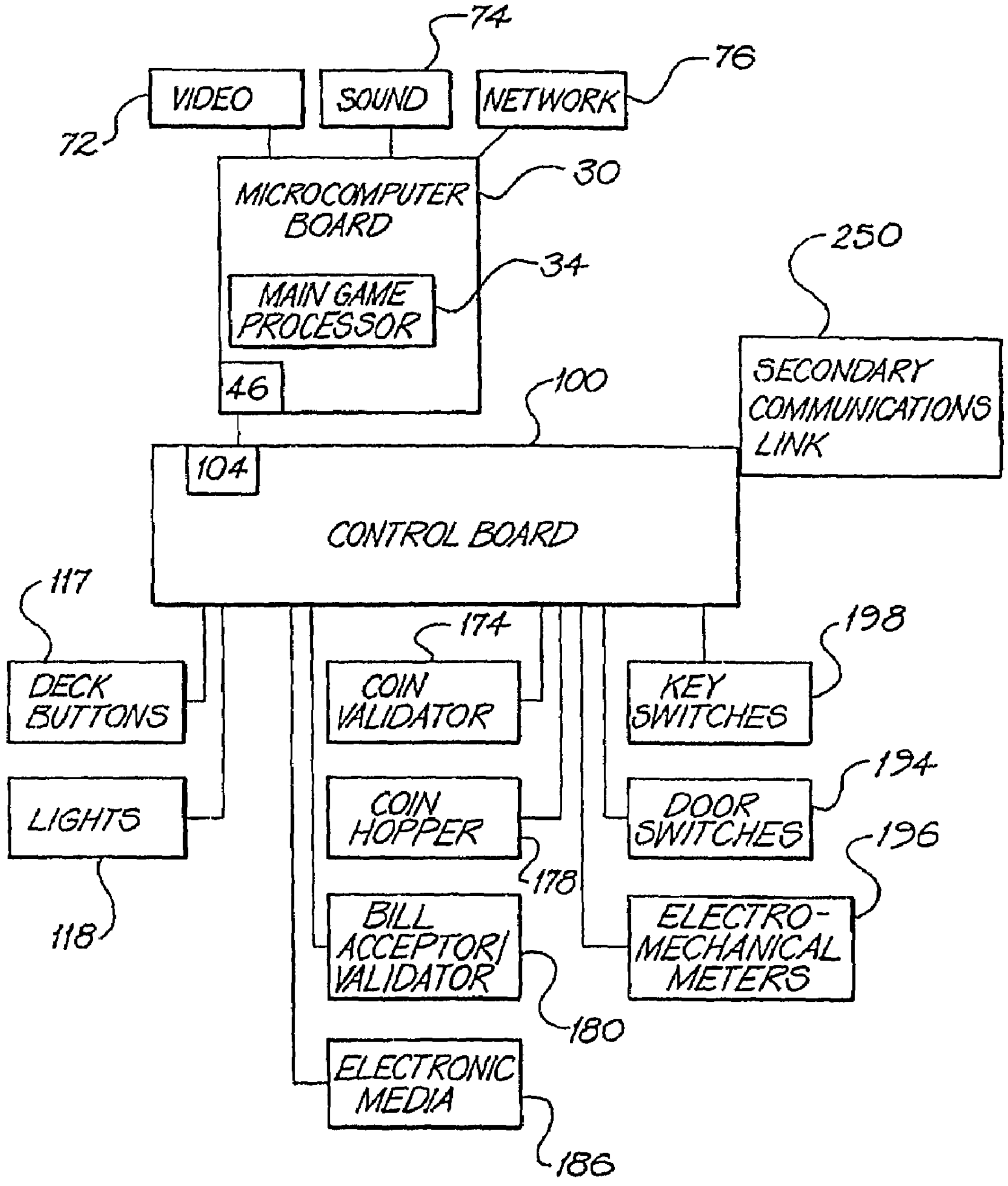
FIG. 3 illustrates the interaction between the Input/Output Control Board of the present invention and the main game processor functions.

The combination of an OS 50 and GUI 52 provide the game developer with a platform that is supported by both industry standard development software and off-the-shelf standard function software for advanced graphics, sound generation, multi-tasking and networking (shown schematically in FIG. 3). The availability of off-the-shelf feature software plus the wealth of development software available significantly reduce the work required to effect integration of new multimedia and network features. The OS 50 and GUI 52 also provide a common software interface (i.e., interface software) to the system hardware 71 (shown schematically as video hardware 72, sound hardware 74 and network hardware 76 in FIG. 2) which allows the software to migrate from hardware platform to hardware platform, without modification to the OS 50, GUI 52 or game software 54. Video hardware 72 includes the display devices described previously in this application, but not meant to be limited to them, such as CRTs, LCDs, etc. that are known to those skilled in the art. Sound hardware 74 includes, but is not meant to be limited to, a variety of speakers, bells, whistles, buzzers, and affiliated electrical components as known to those skilled in the art. Similarly, network hardware 76 includes, and is not meant to be limited to, various microprocessors, storage devices, memory means, communications devices such as modems and computers, wired communications lines such as telephone networks, both public or private, wireless communications systems, as well as such networking hardware known to those skilled in the art.

The interface software system 70 described in Aristocrat's PCT Patent Application No. PCT/AU99/00500, for a Method of linking devices to gaming machines, is specifically designed to isolate the game software 54, OS 50 and GUI software 52 from variations in the hardware platform, such as may occur when using peripheral devices having different interface requirements because they are produced by different manufacturers. Interface software 70 acts as a translator between the complex communication systems of the OS/GUI combination and the bit by bit control functions of the MCB peripherals. Additionally, the design of the interface software 70 allows the ability to "plug and play" new peripherals that may not have been available at the time game software 54, OS 50 and GUI 52 software were written. The flexibility and fault tolerance of this interface software system 70 allow the game software 54, OS 50 and GUI 52 to migrate seamlessly from hardware platform to hardware platform, without requiring the actual redesign and re-certification that is normally associated with hardware changes.

The industry standard electrical interface 46 to the system further isolates the game and its software from variations in the main game controller electronics 30 (see FIG. 2). Using a standard electrical interface 46 allows the gaming manufacturer to design the IOCB 100 to a common electrical interface, without having to account for variation in the design of the MCB 32. The standard electical interface 46 also allows the gaming manufacturer to specify multiple MCB manufacturers for game production, without requiring numerous electrical interfaces that would be specific to individual MCB manufacturers. In the preferred embodiment, this interface is a serial port, the preferred embodiment being an Industry Standard Architecture (ISA) bus, although other interfaces, such as the Universal Serial Bus (USB) or IEEE 1394 FIREWIRE™ bus can be utilised. The FIREWIRE™ bus is a high speed serial bus developed by Apple Computer and Texas Instruments, and it is capable of connecting a plurality of components using a high speed interface.

The I/O Control Board

The Input/Output Control System described in this specification is based on using an IOCB in a gaming device 10 as a means for controlling generic game peripheral devices 71 without the necessity of custom programming the gaining machine 10 to accommodate any specific game peripheral device.

The IOCB system 100 uses an embedded microprocessor 102 (the IOCB CPU) to act as an intelligent game play interface for the MCB 32. IOCB microprocessor 102 is in communication with the MCB 32 of the gaming machine 10 using a communications interface 104. IOCB microprocessor 102 has memory means 106, which includes storage means 108, means for volatile memory storage 110 and means for non-volatile memory storage 112, such as, but not meant to be limited to, firmware or EPROM (Electronically Programmable Read Only Memory) memory. Memory means 106 further includes secured memory means 114. As shown in FIG. 3, game play interface functions managed by the IOCB include a plurality of game buttons 117, a plurality of lamps 118, and a plurality of both high and low resolution feature displays 120 (not shown); coin acceptors and validators 174, bill acceptors and validators 180, bill and coupon dispensers 182 (not shown), card acceptance, card validation and dispensing 186, and coupon acceptance 188; as well as means for control and message routing for the secondary communications bus 250. Each of these peripheral devices are connected to the IOCB at ports 210. Ports 210 can be either serial ports, parallel ports, game ports, or other device interface ports known to those skilled in the art, and are not shown for purposes of clarity, The IOCB 100 monitors the status of all input functions using interface software 70, described in Aristocrat's PCT Patent Application No. PCT/AU99/00500, for a Method of linking devices to gaming machines, buffering and translating their state into a standard control code which is then transmitted to the MCB 32 for processing by the game software 54. The IOCB 100 also accepts output control codes for driving a plurality of game play interfaces 140, 170 and 190, and translating the control codes into the specific format required for the interface and handling all drive and communications protocols required by the game player interfaces. Finally, new game play interfaces 300 (FIG. 5), not specifically configured for in the IOCB board 100, are handled by the secondary communications bus 250. The secondary communications bus 250 handles all communications needed for future game play interface expansion, arbitrating the communications and dynamically configuring the new interfaces for operation with the I/O control board interface software. In conclusion, IOCB system 100 provides a generic translation and control interface between the MCB 32 and the game play interfaces. The IOCB 100 further unloads and receives all configuration and real-time game play interface control functions from the MCB 32, leaving the main game MCB 32 free to manage game play, networking and multi-media display functions.

Figure 4:
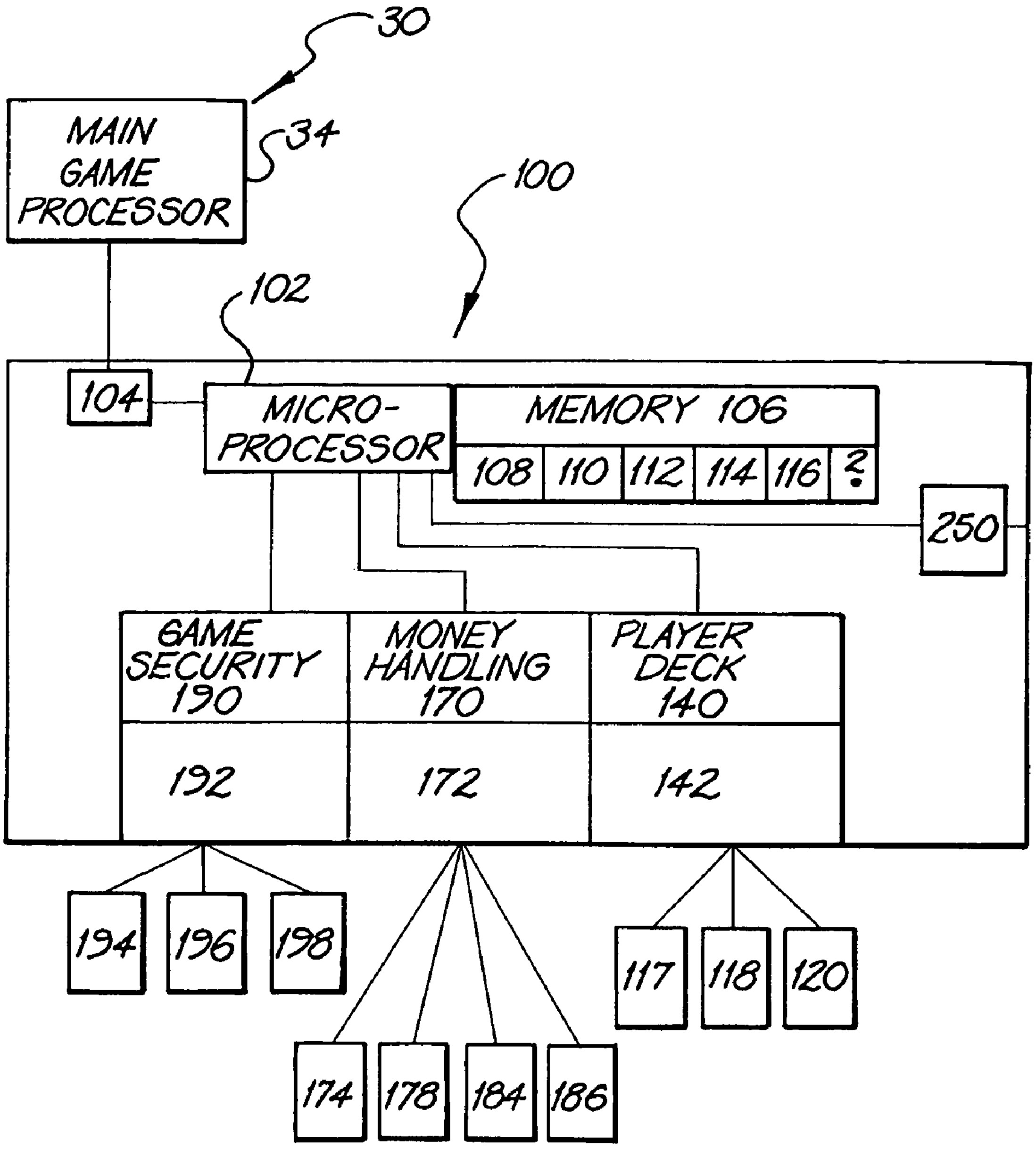
FIG. 4 illustrates the organisation of the Input/Output Control Board of the present invention and game peripheral functions.

The first set of game play interfaces under direct control of IOCB 100 are the player deck interfaces 140 (FIG. 4). The player deck interfaces include deck buttons 117 used in game play, associated deck button lamps 118, and all low resolution displays 120 used for indicating game play status. Player deck interface includes control means 142 in electrical communication with these individual components, and in communication with microprocessor 102 and memory means 104. Player deck interface control means 142 receives and monitors all deck button switch contacts and translates the key press information into specific game key press codes for transmission to MCB 32 by communications linkage 104. Player deck interface control means 142 includes means for driving deck button lamps 118 and displays 120. Player deck interface control means 142 has translation means to translate command codes received from MCB 32 into specific messages and lamp controls, and further includes means to provide all refresh and update functions required for proper display operation.

Money handling interfaces 170 is the second set of interfaces under direct control of IOCB 100 (FIGS. 3 & 4). Money handling interfaces 170 include a control means 172 which controls peripheral devices involved in the acceptance/validation of coins, bills and coupons, vending of coins, bills and coupons, and acceptance of currency/credit via electronic media (i.e., credit/debit cards) (FIG. 4). Money handling control means 172 is in communication with these peripherals, and in communication with microprocessor 102 and memory means 106.

Coin, bill and coupon acceptance/validation is accomplished via dedicated currency validators 174 which accept and verify the authenticity of the currency. Money handling control means 172 and microprocessor 102 are in communication with and monitor the validator's 174 operations, money handling control means 172 providing all control and interface functions required by the currency validator 174 for proper acceptance and validation. Money handling control means 172 in conjunction with IOCB microprocessor 102 formats and translates the currency information for transmission to MCB 32 via communications link 104. It should be noted that certain coupons may require additional validation by the main game processor 32, in which instance money handling control means 172 and IOCB microprocessor 102 transmit the coupon information received from the coupon validator 174 to the MCB 32 for verification. Once verification codes are received back from the MCB 32 by microprocessor 102 and money handling control means 172, the coupons are accepted.

Coin, bill and coupon dispensing is handled by separate vending peripherals such as, coin hoppers 178, and bill/coupon dispensers 184. IOCB 100 controls the operation of the coin hoppers 178 and bill/coupon dispensers 184 directly. Coin hopper control means and bill/coupon dispenser control means are controlled by money handling control means 172 in communication with microprocessor 102. The IOCB 100 initiates and controls all vending of money in response to command codes from the MCB 32 and money handling control means 172 in turn returns confirming vend codes to the coin hoppers 178 or bill/coupon dispensers 184. Electronic media 186 such as credit cards, debit cards, smart cards, or other media known to those in the art, is handled by custom readers 188 which accept and read the identification information from the specific media. These readers 188 transmit this data to the money handling control means 172 which, in conjunction with microprocessor 102, monitors the output from the readers 188, provides any control signals required for acceptance, formats the information, and transmits it to the MCB 32 by communications link 104 for final validation and game credit.

Game security is also controlled by the present invention. The game security interfaces 190 include game security control means 192 which controls peripheral devices such as game door switches 194, electro-mechanical or electronic accounting meters 196, configuration/accounting key switches 198, and the MCB's secured memory storage 114. Game door switches 194 are monitored by game security control means 192, in conjunction with and in communication with IOCB 100's non-volatile monitoring system 116, which detects a door open condition, and can do so even during a power down situation. Upon power up, game security control means 192 receives signals from the door switches 194 and reads the condition of the doors (i.e., whether they are open or closed). Game security control means 192 reports any and all game accesses (indicated by a door open condition) to the MCB 32 for error handling and system notification.

The electromechanical or electronic meters 196 are incremented by game security control means 192 in response to commands from MCB 32. These meters are known to those skilled in the art, and as examples and not meant to be a limitation, generally function to indicate the number of credits remaining, money deposited, etc. In the event of a power interruption prior to completion of the meters increment function, IOCB 100 stores the remaining balance of the meter count(s) in secure memory storage 114. Upon return of system power, secure memory storage 114 transmits the meter increment function to the meter 196 and the meter increment function is completed. Game security control means 192 is in communication with and monitors the status of the configuration/accounting key switches 198 and upon a status change of these key switches, game security control means 192 reports the new state to MCB 32.

IOCB 100 also contains the secure non-volatile data storage means 114 for the main game processor 52. Secure storage means 114 can only be accessed following an unlocking procedure issued by the MCB 32. Secure storage means 114 includes a lock out means 199 which is under control of MCB 32. Access to secure storage means 114 is timed to prevent corruption of the secure storage in case a failure occurs before the main game processor can reset the safety lock out 199. IOCB 100 has power monitoring means 200 in communication with microprocessor 102, such that IOCB 100 can determine an imminent power failure and prevent access to the secure storage means 114.

Figure 5:
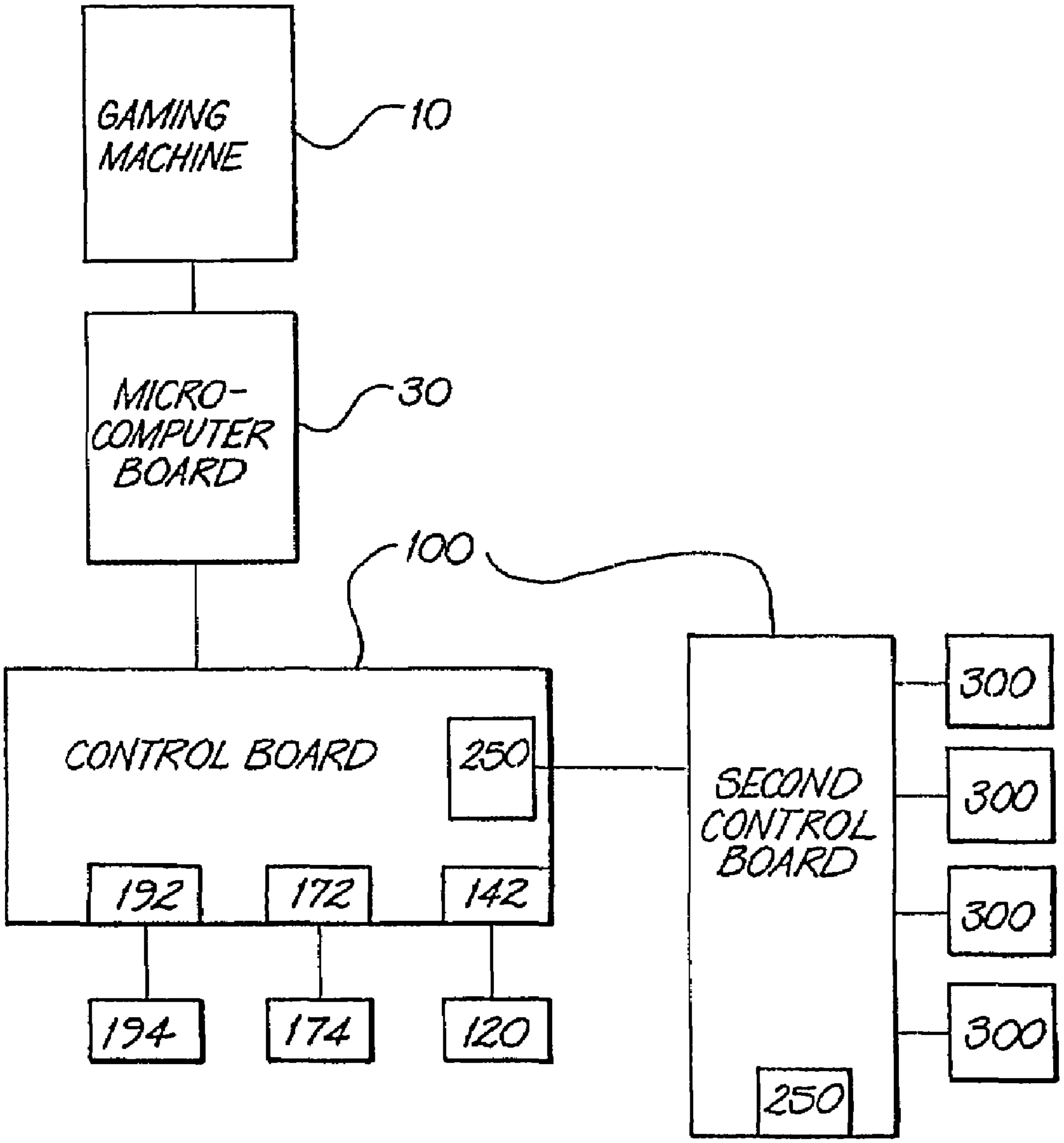
FIG. 5 illustrates the expansion of a gaming system using multiple Input/Output Control Boards of the present invention and game peripheral devices.

Secondary communications bus 250 is in communication with microprocessor 102 and controlled by IOCB 100. Secondary communications bus controller means 252 allows expansion of the IOCB 100 beyond the standard set of interfaces by allowing the connection of additional IOCBs 100 which in turn may be connected to additional peripheral devices, such as shown in FIG. 5. In this capacity, first IOCB 100 acts as a router for commands from the game program, forwarding commands and data using its secondary communications bus 250 to the first communications link 104 of a second (remote) IOCB 100 and verifying the presence and integrity of all message traffic on the secondary communications bus 250. In this manner, additional gaming peripherals can be added without the necessity of custom programming or other modifications of the game software.

An in-depth explanation of the interdependent operational features of the secondary communication bus is presented in our PCT patent application for a Secured inter processor virtual device communications system, No. PCT/AU99/00389.

The IOCB thus provides a generic interface to the microcomputer board of a gaming machine. The IOCB removes the need for configuration specific control routines in gaming software and also isolates the game software from any changes in hardware. The resulting combination of MCB and IOCB provides a game design with built-in high-end multimedia and network capability that can operate on several different MCBs without modification of the game software, yet still maintaining specific control of the game: player interface in real-time. The IOCB allows the ability to "plug and play" new peripherals that may not have been available at the time game software, or the operating system of graphical user interface software were written.

The IOCB acts as a control buffer for the external game play interface; the IOCB translates the generic codes of the game software into the specific codes of the individual interfaces for the various peripheral devices. In this way, specific control codes for an interface and the associated communications protocols required for communicating to the interface can be generalised in the game software with the translation and specific protocols/control codes encoded directly into the IOCB firmware. The expansion communications bus (the secondary communications bus) allows new game play interfaces to be added in the future as new game player interfaces become available. When these new interfaces are connected to the IOCB, the system identifies the new interface and passes its configuration to the appropriate interface software on the MCB. Once identified, the interface software on the MCB locates and loads the additional interface software required to handle the new interface, with the IOCB acting as a message handler between the MCB and the new interface.

Therefore, although this invention has been described with a certain degree of particularity, it is to be understood that the present disclosure has been made only by way of illustration and that numerous changes in the details of construction and arrangement of parts may be resorted to without departing from the spirit and scope of the invention.

The present invention is the communications protocol used between the game CPU 32 and the IOCB 100. The secondary communications system and bar 250 are described in our PCT patent application for a Secured inter processor virtual device communications system, No. PCT/AU99/00389. Communications between the IOCB and the virtual hardware attached to it are handled through low level virtual device drivers. Communications between the game CPU 32 and the IOCB 100 are handled by 46 and communications intergrade 104 of the IOCB, respectively. In the preferred embodiment, communications interface 104 is a high speed interface such as, but limited to, Universal Serial Port ("USB"), or IEEE 1394 "FIREWIRE™". FIREWIRE™ is the registered trademark for a serial bus that allows for connection to multiple devices at high speed.

The preferred embodiment uses the ISA bus, or Input/Output memory bus, to create a parallel message data port, a message status port, and an interrupt request (IRQ) line that allows the IOCB to signal the game CPU when the status port has changed and an interrupt line to the IOCB to signal the IOCB whenever a message data byte is read from, or written to, the message data port by the game CPU. The message data port has a latched memory byte for read and a separate latched memory byte for write. The status port is read and write accessible to the IOCB, and read-only to the game CPU.

Data transfers between the IOCB and the game CPU are based on a transport framed packet protocol having the following construction:

[Virtual ID] [size] [sequence#] [Command] [ . . . body . . . ] [ETX] [CRC-16]; where:

Virtual ID: this byte is a circuit number the game CPU uses to route the message to the correct software driver. Each software driver is given a different circuit number. The software driver will interpret the message command and body received from the device in the context of that device type. Any device messages to the IOCB device itself, are addressed to Virtual ID zero. This address is for the abstracted hardware is assigned by the IOCB and reported to the game CPU in the request table or new hardware messages.

Size: this byte is the character length of the packet from Virtual ID to the ETX inclusive;

Sequence #: this byte is the sender's next sequential transmission number. Thus, the sequence number of messages going from the game CPU and to the game CPU are kept and tracked separately. The receiver maintains an expected sequential reception number corresponding to the sender's next expected sequence number. This sequence number initiates to zero and increments by 1 for each successful transmission, wrapping at 256 back to 1. The value of 0 is only used on initial setup, and if zero, the receiver will reset its expected sequence number. Successful transmission implies the receiver has accepted the valid transaction (all packet criteria have been satisfied), and responds to the sender by transmitting an acknowledge (ACK) packet to virtual ID zero, which will cause both the sender and the receiver to increment the sequence number for the sender's next expected message. This receipt of ACK packet is itself not acknowledged;

Command: this byte informs the receiver what to do with the date (if any) in the body of the message. An ACK command, for example, acknowledges the sender's last received packet and would have zero bytes in the body of the message. Similarly, the IOCB would send a LINK REQUEST command (with zero bytes) to the game CPU on power-up, which requests a communications link. Another example not meant to be limiting would be a Bill Acceptor transaction with a command of B stating the Bill Denomination is the message body;

Body: the message body is a variable number of bytes from 0-248, which contains pertinent date regarding the transaction. This field may be the denomination of the bill accepted, it may be the coin denomination, or it may be a Player's Account processed by the Magnetic Card Reader. The actual specifics are determined by the Virtual Device involved.;

ETX: this End of Transmission (ETX) byte is used for packet validation; and

CRC-18: this 2-byte field is a 16-bit Cyclic Redundancy Check (CRC) value which is generated using a 16-bit reverse polynomial-based algorithm performed on each transmitted/received byte. With this 16-bit value initially set to zero, each byte of the device's Board ID is CRC'd as well as the device type byte (whether the device is Coin Mechanism, Bill Acceptor, Video display, etc.). The resultant 16-bit value, called the seed, is used as the initial value prior to applying the CRC algorithm to each byte in the packet the packet is CRC'd from Virtual ID to ETX inclusive.

Data transfers between the IOCB and the game CPU use the message data port, and a message status port. The message status port has the following construction:

| | Bit | | | | | | | |
|---|---|---|---|---|---|---|---|---|
| | 7 | 6 | 5 | 4 | 3 | 2 | 1 | 0 |
| Flag | RTR | RA | RTT | TA | BUSY | 0 | ZERO | RESET |

(Ready to Receive) indicates the IOCB is ready to receive a data byte. If the game CPU has a character to send, it reads this status bit and if set, will send the character. If reset during a message transmission from the game CPU to the IOCB, a time-out interval is initiated if the time-out interval expires, the game CPU will abort the balance of the transmission and retry sending the message after an additional two time-out intervals, and the ready-to-receive bit is set.

RA (Receive Aborted) should the IOCB detect a communication error while it is receiving data, or the IOCB has detected a change to the hardware side that could affect any messages being set to it, this bit is set indicating abort of the transmission from the game CPU. The game CPU monitors this bit prior to sending a character, and, if set the game CPU will abort the balance of the transmission and retry sending the message after three time-out intervals, when both the ready-to-receive bit is set and the receive aborted bit is cleared.

RTT (Ready To Transmit): if the IOCB has data to send, it sets this bit and asserts the interrupt Request to the game CPU. When the interrupt is serviced and the character has been read, the IOCB's hardware is notified via an interrupt, and the IOCB resets this bit if there are no bytes to send from the current message. If there are more bytes to send, the IOCB places the next byte on the message port, without resetting the ready-to-transmit bit and triggers the Interrupt Request to the game CPU.

TA (Transmit Abort) while transmitting a packet to the game CPU, if the IOCB detects an internal transmission error, or the IOCB has detected a change to the hardware side that could affect the message being sent, it will set this bit indicating the remainder of the message will not be sent. If the game CPU detects this bit set, it will clear any previous characters received and abort the receive process.

Busy: to prevent the game CPU from an erroneous time-out on a data transfer, the IOCB will set this bit if the IOCB is busy processing a critical application, then resetting the bit upon completion. The game CPU will ignore the inter-character time-out interval, but, upon expiration of the inter-message time-out interval, which is three times the inter-character time-out, the game CPU will reset any pending messages being received or transmitted.

O: this bit is reserved for future use.

Zero: should the IOCB and the connection between the game CPU be disconnected, the bus input of the interface hardware will be high. To prevent erroneous actions based on bit levels being set, this bit must always be reset. If this bit is set, this bit must always be reset. If this bit is set, the hand shaking flags of this register should be ignored.

Reset: whenever the IOCB is powered up or reset, this bit is set which notifies the game CPU of these conditions. This alerts the game CPU to set the "state" of the gaming devices in the machine. Whenever initial communication is established between the IOCB and the game CPU, this flag is reset.

The following rules govern the generation of interrupt request during message transfers (Table 1) Any time the game CPU reads or writes the data port, the IOCB receives an interrupt.

Whenever the flag change results in one of the following conditions, the game CPU receives an interrupt.

TABLE Q

| IOCB IRQ Generations Rules | |
|---|---|
| RTR & Not Busy & Not RA | IOCB read last byte sent. |
| RTT & Not Busy & Not TA | IOCB has a byte to be read. |
| RA | Abort sending packet |
| TA | Abort receiving packet |

In the preferred embodiment of the present invention in which the communications link between the game CPU and the IOCB uses either USB or FIREWIRE™, there are no pertinent inter-character time-out. In those embodiments in which the communication link uses a message port and status flag, message traffic is controlled with time-outs. There is an inter-character time-out within a message that is one or two milliseconds, and there is an inter-message time-out that is three times the inter-character time-out. Because the message port is bi-direction, there is a set of timers for messages going from the IOCB to the game CPU and another set of timers for messages going from the game CPU to the IOCB. Each component, both the IOCB and the game CPU, keeps track of these two timer sets. If the inter-character time-out interval expires, the current message being transferred is in error, and will be aborted (see 458, 462, 464 for the game CPU, in FIG. 6*b*, and 508, 510, 521, for the IOCB in the FIG. 7). If the busy flag 403 is raised while the message is being transferred, the game CPU will give the IOCB an extra five time-out periods before declaring an error and aborting the message transmission (see 403-406 in FIG. 6*a*). The inter-character time-out is not cumulative, and is reset after each new character is received (see 418, 424, 465) for the game CPU, in FIG. 6*a* and 516, 528, for the IOCB FIG. 7.

All messages, sent both directions, are separated by the inter-message time-out. That means that no message can be sent unless the time interval between the current message to be sent and the end of the previous message sent is greater than or equal to the inter-message time-out. So if game CPU is receiving a message from the IOCB, and there is an error that causes the game CPU to ignore the message, the game CPU will discard all characters received until there is a time gap that is at least as long as the inter-message timeout (see 412, 420 in FIG. 6*a* for the game CPU and 530, 522 in FIG. 7 for the IOCB). The character received after an inter-message time-out will be treated as the start of a new message packet. (see 412, 414, 416, 418 in FIG. 6 for the game CPU, and 530, 532, 534, 536, FIG. 7 of the IOCB).

When a message packet has been received by either the game CPU or the IOCB, the CRC is checked to see if the packet has any errors. (See Fig. at 438 and 548 in FIG. 7*a*) The starting seed, which is supplied by the IOCB in the hardware abstraction table (defined farther on in the text), for the virtual ID is loaded, O in the case of virtual IDO, and each byte of the message is fed into the Cyclic Redundancy Check Algorithm including the CRC of the message packet. If the resulting CRC value is zero, then the CRC on the message packet was okay and there were no errors in the message.

After receiving a good message, the receiving communication driver will generate a acknowledgment (ACK) message to virtual IDO with the command code for ACK and the sequence number of the message being acknowledged. Since the ACK message is addressed to virtual IDO, the starting value for the CRC's 0. The CRC algorithm is applied to the ACK message, and the resulting CRC is appended. The ACK message is then queued to be sent next. The ACK message is not acknowledged, nor does it affect the sequence numbering of the transmitting side, or the expected sequence number on the receive side.

While the transmitting side is waiting for an ACK message corresponding to a sent packet, it can continue to receive packets. If after sending a packet while it is waiting for an ACK message, the sender is also receiving a packet, the sender will expect the very next packet after the current packet and after the inter-message timeout, to be the expected ACK message. Therefore, if after a time period corresponding to the sum of an inter-message timeout period and an inter-character timeout period of another packet that isn't an ACK message for the packet sent, the sender will resend the packet. The sender will retry sending a packet three times. If after three retries there still has been no acknowledgment for the pocket the sender will request the other side to verify the existence of the virtual ID in the packet. If the virtual ID is not verified, there is an error. No communication should occur until after a virtual ID has been assigned in a request table message or a new hardware message. If the virtual ID does exist, the sender will discard the packet and continue sending and receiving other messages. (See, for example FIG. 6A at 416-420). The originator of the message packet thrown away will resend the packet until it is acknowledged. The initial step is to verify that communications between the game CPU and the IOCB can occur reliably. The communications between the game CPU and the IOCB are described in FIGS. 6 & 7.

Figure 6A:
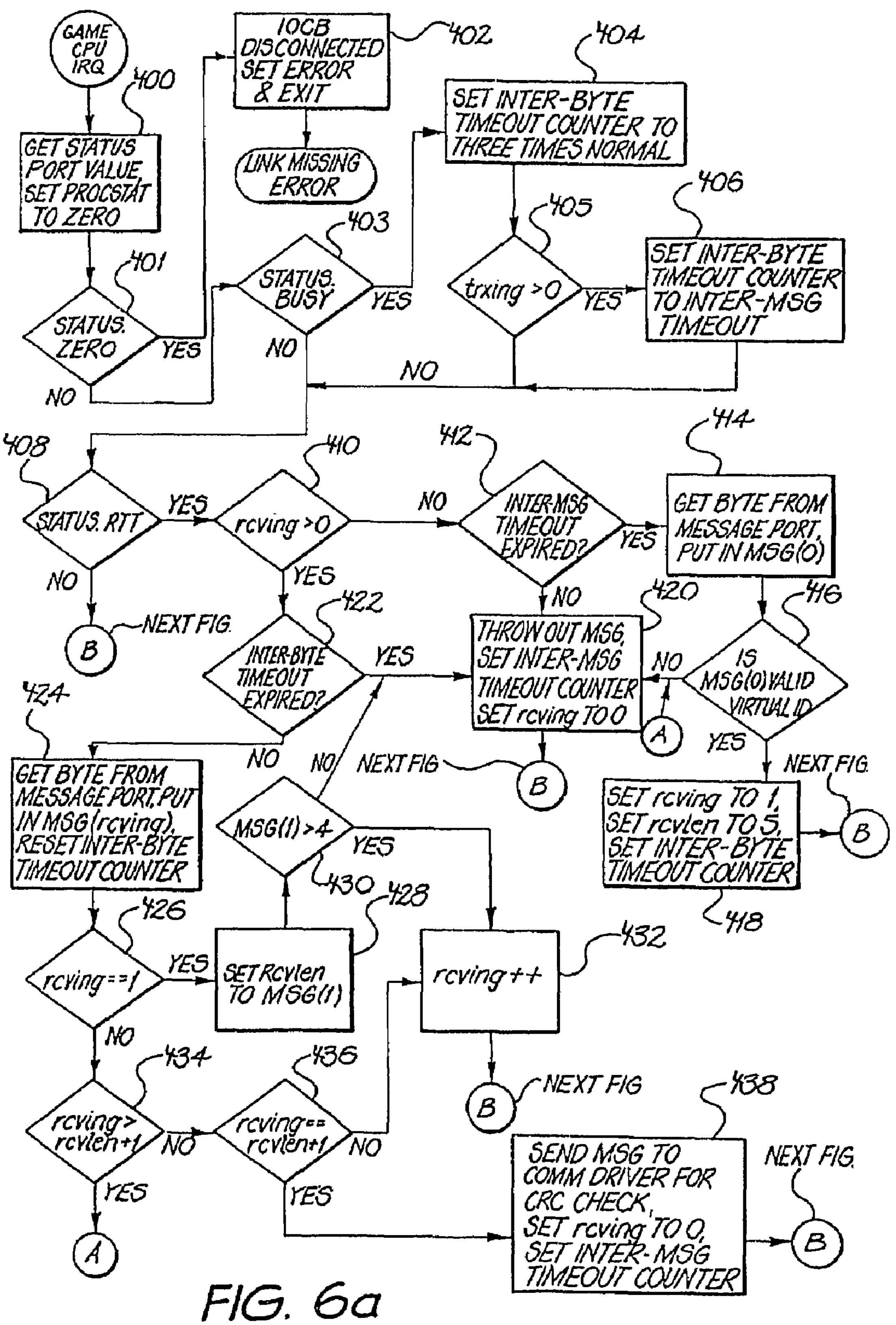
FIG. 6*a* and FIG. 6*b* combined are a flowchart of the Interrupt Service Routine for the game CPU software to monitor the message status and data ports for message traffic.
Figure 6B:
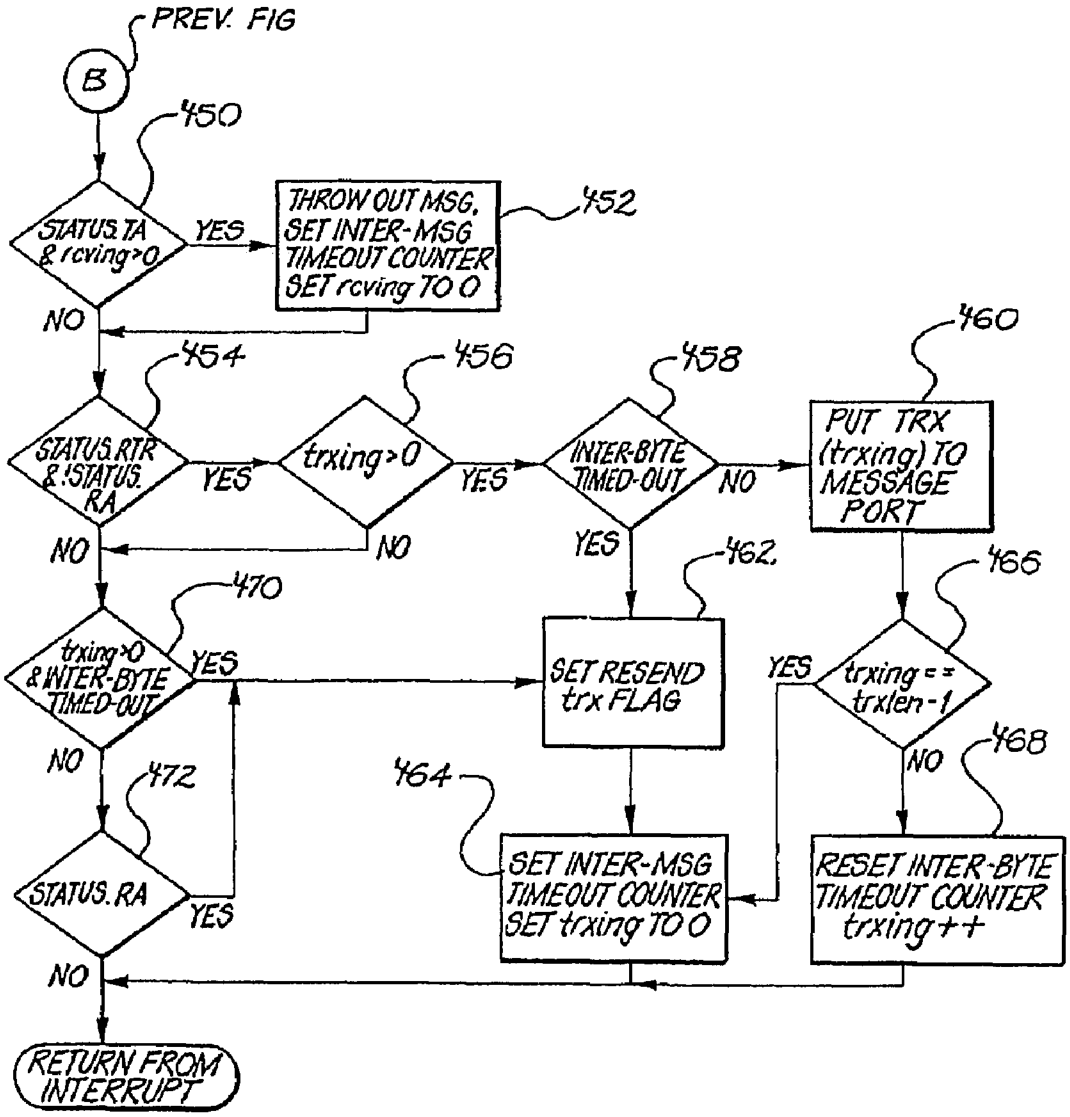

The overall communications protocol between the game CPU and the IOCB are shown in FIGS. 6*a* and 6*b*. The process is initiated when the game CPU 32 sends an interrupt request to the IOCB at 399. The first step is to determine whether an IOCB is present and connected to the game CPU The IOCB checks the value of the message status port and sets the procstat to zero, at 400. The system determines whether [the procstat byte] is set to status zero at 401. A "yes" indicates that the IOCB is disconnected from the game CPU at 402, an error is set, the communications protocol is exited and a "link missing" error is displayed.

If the status is not equal to zero, at 403 the IOCB checks whether the bit is Busy. If yes, it indicates the bit is processing an application and there should be no interruption consequently, the IOCB sets the inter-byte timeout counter to three times its normal period at 404.

The CPU will transmit to the IOCB on expiration of the extended inter-byte timeout at 405, and if the transmission to the IOCB is completed, at 406 the inter-byte timeout counter is set to the value of the inter-message timeout, approximately 1-2 milliseconds as described previously.

If, however, the status was not busy at 403, or after the system has become free at 406, the game CPU determines whether the IOCB's status is Ready-to-Transmit (RTT) at 408. If the IOCB is not ready to transmit, at 149 at game CPU, as will be described further in FIG. 6*b*, determines at 450 whether the IOCB's status is Transmit Abort (TA).

If at 408 the bit is set at Ready to Transmit and, at 410, receiving is not greater than zero, and the inter-message timeout has expired at 412, then the game CPU, at 414, gets the appropriate byte from the message port and is set at message zero (or circuit number zero). At 416, the system determines whether the message [at register] zero has a valid virtual ID; if the virtual ID is valid at 418, the system checks the bit for Transmit Abort Status (FIG. b at 450).

If at 408 the bit is set at Ready to Transmit, and at 410 receiving is greater than zero, at 422 the game CPU determines whether the inter-byte [timeout?] counter has expired. If this timeout has not expired, at 424 the system gets a byte from the message port, puts it in message [receiving] and resets the inter-byte time out counter, and, the receiving messages is not greater than or equal to 1 at 426. The game CPU determines whether the message being received has a value that is greater than the messages received plus one (at 454). If this is determined to be "YES" at 435, the system loops back to 419.

If at 408 the bit is set at Ready to Transmit, and a 410 receiving is not greater than zero, and the inter-message timeout at 412 has not expired, the game CPU proceeds according to reference numeral 420.

Similarly, if at 426 receiving was greater than or equal to one (same comment as just above) receiving is set to message [1] at 428, and, at 430, the value of message [1] is not greater than 4, game CPU proceeds according to the protocol at reference numeral 420. At this point 420, the message is discarded, the inter-message timeout counter is set, receiving is set to zero, and the bit is then checked to see if its status is Transmit Abort at 450 (FIG. 6*b*).

If at 430, the value of message [1] was greater than 4, at 432 receiving is set and the game CPU determines (FIG. 6*b*) whether the TA bit is set. If at 434 received was not greater than the value of the number of messages received plus one, at 436, the message is sent to the communications driver for verification using a CRC check at 438, after which a determination of the status of the bit for TA is made at 450 (FIG. 6*b*).

Other events, shown in FIG. 6*a* that will trigger the "Status TA" inquiry (FIG. 6*b*) at 450, are the following: During the receiving stage, at 420, expiration of the inter-byte timeout at 422, a non-expiration of the inter-message timeout at 422, or an invalid virtual ID at 416, will cause the game CPU to discard the message being, set the inter-message timeout counter and set receiving to O. If the message being received has a valid virtual ID, receiving is set to 1 for the received massage. Review is set to 5 and the inter-byte timeout counter is set at 418, then the system checks whether the status is set to Transmit Abort at 450 (FIG. 6*b*). Where there are errors in the transmission process, such as at 430 where message 1 is greater than 4 or at 436 when the value of received message does not equal (the previous number of messages received) plus one, the game CPU checks for Transmit Abort status at 450 (FIG. 6*b*). Last, if the value of the message number received is correct at 436, after the message is sent to the communications driver for verification using the CRC check at 438, the game CPU checks the Transmit Abort Status of the byte at 450 (FIG. 6*b*).

Referring now to FIG. 6*b*, at 450 the game CPU determines whether the IOCB is set for Transmit Abort and whether the receive value is greater than zero. If this is a "yes", at 452 the message is discarded, the inter-message timeout counter is set and receiving is set to zero, and the protocol proceeds as if a "no" answer was received at 450, to reference numeral 454.

At 484, the game CPU determines the status of the Ready-To-Receive (RTR) and the Receive Aborted (RA) bits. If the IOCB is ready to receive, the game CPU will attempt a transmission at 456. If the transmission is successful, at 458 the game CPU checks whether the inter-byte [timeout counter?] has timed out. If the transmission was unsuccessful, or if the bit was not set as Ready-To-Receive, at 470 the game CPU inquires whether there has been transmission and whether the inter-byte has timed out. If that answer is no, at 472 the status of the Receive Aborted bit is determined. A negative response enables the game CPU to return from the interrupt.

Referring back to reference numeral 458 in FIG. 6*b*, if the inter-byte has been timed out at 458, or at 470, or the Receive Aborted bit is set at 472, then at 462 the resend transmit flag is set.

If at 458, the inter-byte has not timed out, at 460 a transmit message is sent to the message port. If the value of the message transmitted is equal to a value of one less than the number of messages transmitted at 466, then at 464, the inter-message timer counter is reset, transmission is set to zero, and the system returns from the interrupt. Similarly, at 468, the inter-byte timeout counter is reset or after the resend transmission flag has been reset at 462, the system will return from the interrupt.

Figure 7:
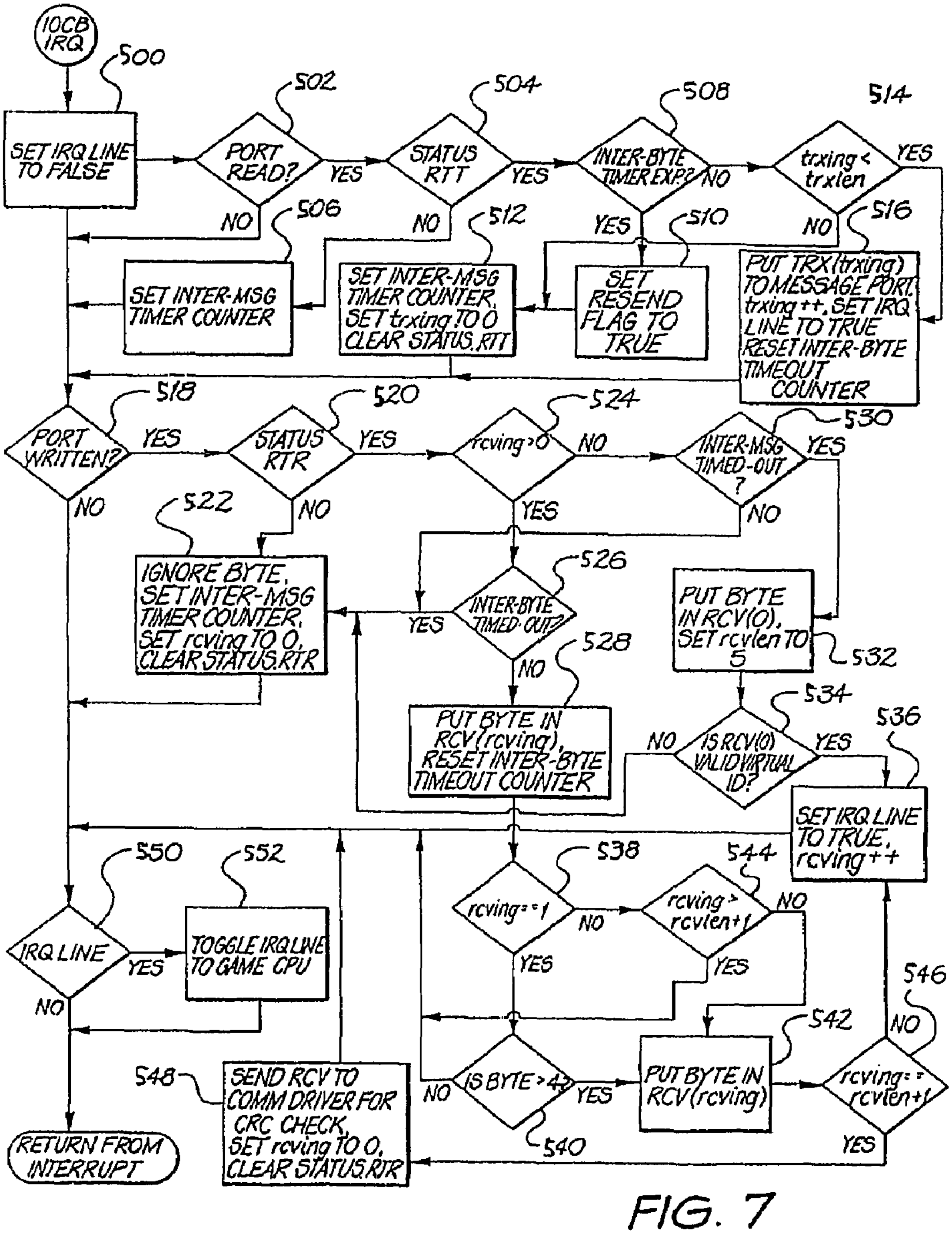
FIG. 7 is the flowchart for the Interrupt Service Routine of the IOCB for software that monitors the message status and data ports for message traffic.

The interrupt service routine of the IOCB is shown in FIG. 7. This chart: illustrates monitoring the message status port and the data port for message traffic from the IOCB.

The IOCB sends an interrupt request at 499 to the port, which at 500 sets the IRQ line to FALSE. The IOCB determines if the port is being read at 502. If the port is not being read, the IOCB determines if the port is being written at 518. If the port is not being written, at 550 at the IRQ line.

If it occurs, at 552 the IRQ line is toggled to the game CPU, allowing a return from the interrupt at 553.

If at 502 the port is being read, and the bit status is not Ready to Transmit (RTT) at 504, the inter-message timer counter is set at 505 and the IOCB determines if the port is written at 518, as described above.

If the bit status is Ready to Transmit at 504, and at 508 the inter-byte times has expired, the resend flag is set to TRUE at 510. This is followed by the inter-message timer counter being set at 505, and a determination as to whether the port is being written at 518, as described above.

If the bit status is Ready to Transmit at 504, and at 508 the inter-byte timer has not expired. If at 514 the number of transmissions is not less than the number of transmitted messages at 512, the inter-message timer counter is set, the number of transmission is set to zero, and the bit is cleared of its RTT status. After this step, the IOCB determines if the port is written, at 518, as described above.

If at 514, the number of transmissions is less than the number of transmitted messages, at 516 the IOCB sends a transmit message to the message port, sets the IRQ line to TRUE, and resets the inter-byte timeout counter. Upon completion of the procedure at reference numeral 516, the IOCB determines if the port is written, at 518, as described above.

When the IOCB determines the port is being written at 516, if its status at 520 is not Ready to Receive (RTR), then at 522, the status RTR byte is ignored, the inter-message timer counter is set, receiving is set to zero and the status byte is cleared. Upon completion of the steps a reference numeral 522, the IOCB addresses the IRQ line at 550, as previously described.

If the virtual ID for RCV[O] is not valid at 534, the IOCB ignores the byte, clears the status RTR at 522, and, as previously described, proceeds to address the IRQ line at 550.

If the byte status for Ready to Receive at 520 is set, and the receiving message is greater than zero at 524, then if the inter-byte has timed out at 526, the IOCB ignores the byte, clears the status RTR at 522, and, as previously described, proceeds to address the IRQ line at 550.

When the byte status for Ready to Receive at 520 is set, the receiving message is greater than zero, but at 526 the inter-byte has not timed out, then at 528 the byte is put in RCV (receiving mode) and the inter-byte timeout counter is reset. The IOCB determines whether receiving 1 at 538. If at 538 receiving 1, and the byte is greater than 4 at 540, at 542 the byte is put into receiving. If the value for the received message is equal to the value of the previously received messages plus 1 (at 546), the byte is sent to the communications driver for validation using a CRC check at 548. The receiving byte is reset to zero, the status Ready to Receive is cleared, and, as previously described, the IOCB proceeds to address the IRQ line at 550. If at 546 the value for the received message is not equal to the value of the previously received messages plus one, at 536 the IRQ line is set to TRUE, and the IOCB proceeds to address the IRQ line at 550 as described previously.

If at 538, receiving is not equivalent to 1, and at 544 the value of the received message is greater than the value of the previously received messages plus one, the IOCB proceeds to address the IRQ line at 550 as described above.

When the value of the received message is not greater than the value of the previously received messages plus one, at 542, the byte is put in RCV at 542, verified, and the IOCB proceed to address the IRQ line at 550 as described previously.

If the inter-message counter has timed out at 530 after it has been determined that receiving is not greater than zero at 524, then, at 532 a byte is put in RCU[O]. Receiving is also set to 5. After these settings have been made, the virtual ID is validated at 534. A valid virtual ID results in the IRQ line being set to TRUE, and receiving to it, at 536. The IOCB then proceeds to address the IRQ line at 550, as previously described.

Monolithic gaming machines have been described earlier, in which a single CPU controls the gaming machine and its affiliated hardware devices. One aspect of the present invention, described above has shown that there is reliable communication between the game CPU and the IOCB. The other aspect of the present invention is that the hardware attached through the IOCB to the game CPU must be abstracted.

As used in this specification abstraction refers to the process of shifting the source of the software necessary to control a particular device from a CPU contained in that particular device to another CPU that is remote to the particular device. This other CPU may contain additional software to control other specific hardware devices which also are connected to, yet remote from, this other CPU. In a sense, the hardware is already physically abstracted, in that it is not directly attached to the game CPU as in previous monolithic (single CPU) game designs. The general method or protocol of communicating with the hardware should also be abstracted. Since the interface between the game CPU and the hardware is no longer dedicated, as in a monolithic game, adding a layer of abstraction provides the game software with enough flexibility to properly adapt and correspond to new hardware arrangements.

The common physical attribute hardware devices from the game CPU's perspective is that the hardware devices are all controlled by a CPU (that of the IOCB) other than the game CPU. The game CPU does not have to use processing bandwidth to directly control or interact with a peripheral device until an event on that device, such as a jackpot to be paid out, actually happens. Since all the hardware devices that are attached to the game CPU through the IOCB have a CPU to control them, the software on the IOCB CPU can add or modify features or attributes other than those normally directly supported by the hardware devices. This makes abstraction of the hardware devices easy, by adding the abstracted features to the software in the IOCB's CPU, thereby controlling the operation of the hardware devices. Some examples of hardware devices that can be attached to the game through the IOCB, but not limited to these, might be: buttons, lamps, coin acceptors, card acceptors, bill acceptors, hoppers, coupon dispensers, bells, reel mechanisms, dice mechanisms, wheel mechanisms, feature displays, and door switches.

Some attributes of the attached hardware devices, but not limited to these, that could be added to the IOCB software to make the hardware devices easier to use include: a hardware type, a hardware subtype, a serial number, a hardware/software revision level, a hardware state (whether enabled, disabled, reset, and other states that are hardware dependent), a hardware status (okay, disabled, error, etc) and a hardware dependent configuration. The hardware type would tell the game CPU what type of device is attached; this includes information for communicating with the device. The hardware subtype would allow finer resolution of the hardware type. For example, a coin acceptor or hopper would use the hardware subtype to determine the configured denomination, i.e., nickel, quarter, or dollar token. The serial number allows the game CPU to discriminate between the same hardware types. This function is particularly important in view of the trend to employ multi-game machines, or gaming machines which may be connected to a plurality of identical devices such as, for example, multiple coin acceptors. The serial number provides a unique identifier for each device. The hardware/software revision level tells the game CPU what feature/attribute set to expect. As hardware of software is updated, new feature/attributes are added or changed, the revision level informs the game CPU what capability to expect from the attached and abstracted hardware. The hardware state allows the game CPU to control the overall gross functioning of the hardware device. For example, if the state were set to enabled on the coin or bill acceptor, they would accept money. The game CPU would change the state to disabled to turn the hardware device off. The hardware status would tell the game software if the device is operable, and what operation it is currently performing. The game software can not affect the status: it is merely reported to the game CPU. The status settings beyond the generic setting of "okay," "disabled," and "error" are hardware dependent. For example, a hopper could have states for "forward" and "reverse," or a bill acceptor could have states for "vend," "reject," "escrow," and "stacking." The common states would all have the same numerical code from device to device, but extended states like "forward" and "vend" could have the same numeric code, but would be differentiated by the hardware type.

As described in Aristocrat's PCT Patent Application, No. PCT/AU99/00500, for a Method of linking devices to gaming machines, many of these abstracted attributes are stored within the IOCB's memory in a plurality of jurisdictional and hardware tables.

In addition to the attributes of the attached hardware devices, the abstraction process needs to include commands to control these devices. Three important hardware abstraction commands are open, close, and acknowledge. The open command is used to inform the abstracted hardware, the virtual ID that has been assigned to it. The virtual ID is determined by the factors which include the hardware type and subtype and serial number. The acknowledge command is needed to provide positive control of the end-to-end message traffic with the abstracted hardware. The use of the acknowledge (ACK) command for message control has been described above, with respect to message traffic between the game CPU and the IOCB. The close command is used when the portion of the game CPU software that uses the hardware device is unloaded or inactivated. For example, in a multi-game platform, one particular game could use some special hardware. When the player selects that game to play, the game software on the game CPU opens the virtual circuit to the special hardware required. Once the player finishes that game, and chooses another game, the game software would close the virtual circuit to that special hardware.

The abstracted hardware attributes informs the game CPU how to communicate with the hardware device. Hardware abstraction commands affect message flow. Another aspect of the abstraction process includes abstraction of the communications protocols. An important abstraction for communications to the hardware devices is a level of message acknowledgment and number of retries form the perspective of the sender/receiver end points. The transfer protocol handles the transfer from game CPU to IOCB, and vice-versa. The hardware controller must have acknowledgment form the game CPU that the message sent was understood and processed; while the game CPU must have the same positive knowledge that the hardware has received and is executing the command sent to it. The preferred embodiment uses positive acknowledgment for receipt of messages.

This level of positive acknowledgment is built into the same level as the hardware attributes and features described above. These are encapsulated into the body of the framed transport packet protocol using a similar message structure, but without the Command, ETX, and CRC bytes. The encapsulated message in the body of the transfer protocol would look like:

[Virtual ID] [endpoint sequence*] [ . . . body . . . ]

and therefore the whole transfer packet would look like:

[Virtual ID] [size] [seq. #] [Command] [Virtual ID] [endpoint seq. #] [ . . . body . . . ] [ETX] [CRC-16]

The size of the abstracted body data is encoded within the transfer protocol packet, and is thus not copied. The delivery of the packet to the device will continue to have the outside message length. The virtual ID is needed in the body, since the IOCB could deliver the packet to a single device address that could contain several hardware functions. The command does not need to be encapsulated into the transfer protocol body, since the IOCB will use the command in the packet to the hardware. Each of these separate functions could have its' own hardware type, or subtype, serial number, and virtual ID. The virtual ID is assigned based on the uniqueness of the combined type, subtype, and serial number. For multi-function devices, these fields must map out unique for each separate function. The serial numbers, could be the same, but the hardware types must be different, or vice-versa, such that the end result is a unique combination or both the types and serial numbers could be unique (different).

An additional feature of the hardware attributes to be abstracted (an abstraction extension to basic hardware) is the packetization (breaking up into smaller packets) of large blocks of data. This would be dependent upon the need of the hardware for the data, and the amount of memory available to rebuild the larger data packet from the sub-packets in the CPU controlling the hardware. The sub-packets would be built in the body of the transport protocol packets. The originating packet sender would negotiate with the receiving end on the total size of the large data packet, and the number of sub-packets. After the receive end has agreed to the transfer, the sender will place the sub-packets, with a sequence number to serialise the sub-packets and build the larger data packet in the correct order, on the transfer protocol medium.

An example of packetization would be the game CPU downloading new firmware to a hardware device. If the hardware device firmware is a total size of 65536 bytes (65 KB), and the flash that contains it can be programmed in 4096 byte (4 KB) blocks, the game CPU could negotiate the transfer as 16 transfers of 4 KB blocks. Each block could be broken down into 32 sub-packets of 128 bytes (plus 2 bytes for start address/sequence), or 16 sub-packets of 240 [sub-body] bytes (plus bytes) with one sub-packet of 16 bytes (plus 2 bytes), or any variation of that while keeping in mind the transfer protocol packet can have at most 245 bytes in the abstract sub-body of the transfer protocol body. Each sub-packet would be acknowledged end-to-end to insure that all packets are transferred reliably. After each block of subpackets are sent, the sender would wait for acknowledgment of the overall block transfer, and the message from the receiver to start the next block transfer. After the last block has transferred and been acknowledged, the receiver would finally send a message acknowledging the whole transfer. If at any of these acknowledge points there is no acknowledgment, the sender and receiver would negotiate the There are some special hardware abstraction meta-commands that exist between the game CPU and the IOCB. These extend to the abstracted hardware devices themselves, but are used for control of the hardware devices.

These meta-commands would be passed back and forth on the transfer protocol packet command level as dedicated (pre-defined) packet command bytes. One of the transfer packet command bytes would allow the game CPU to ask the IOCB for the hardware abstraction table. This table is a list of the devices the IOCB has registered, and assigned, a virtual ID. The table also contains the hardware type, subtype, serial number, revision level, and starting CRC seed of the device. Further details about the hardware abstraction table can be found in our PCT Patent Application No. PCT/AU99/00500, for a Method of linking devices to gaming machines. The game CPU could use another defined command byte to tell the IOCB to delete a hardware device form the table. When the IOCB receives this command, it informs the hardware device to be deleted that it is deleted and should not try to re-register with the IOCB (see Aristocrat's PCT Patent Application for a Secured inter-processor/virtual device communications system No. PCT/AU99/00389).

The IOCB will move the entry for the hardware device form the hardware abstraction table to the deleted table, in case the hardware device is reset and tries to re-register. The IOCB could send a message with a defined command byte informing the game CPU that a hardware device has been added. Either the game CPU or the IOCB could use the same defined command byte to ask the other side to verify that a virtual ID exists. If it is the game CPU asking the IOCB, the IOCB will also search the deleted table. If the entry is deleted, the IOCB will verify the ID, but also that it is currently deleted. This command is used when a packet is not being acknowledged (see previous communication retry text). The game CPU could ask that a device be reset. When the IOCB receives this command, it will force the hardware device to reset and go through the PC address registration process (see our PCT Patent Application for a Secured inter-processor/virtual device communications system, No. PCT/AU99/00389). If the game CPU configuration changes so that it can now allow hardware that was previously deleted, the game CPU can send the IOCB an undeleted command to remove the entry from the deleted table. The IOCB would then have the device reset and reregister for an $I^2C$ address. Once this is done, the IOCB would report the device as new hardware. When the IOCB loses communication with a hardware device, after a retry and timeout period, the IOCB sends a message to the game CPU informing the game CPU that hardware has been removed. All meta-commands at this level are addressed to virtual device zero, which is the game CPU and the IOCB devices.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming machine comprising:

a main game processor configured for carrying out game instructions;

a device adapted to interface with the main game processor;

an input/output controller including a communication interface with the main game processor, said device in communication with the controller, said controller configured to enable communication between said device and said processor, wherein said controller provides an abstraction of attributes and commands for control of said device, said abstraction allowing said main game processor to communicate with said device via said input/output controller while being isolated from variations in device configuration, said abstraction applying to both a hardware arrangement for said device and a protocol of communicating with said device, wherein said input/output controller unloads at least a portion of control of said device from said main game processor to reduce a load on said main game processor.

2. The machine of claim 1, wherein said main game processor is programmed to include an operating system and a graphical user interface.

3. The machine of claim 1, wherein said device includes a device code and said input/output controller is configured to translate the device code into a control code transmitted to said main game processor.

4. The machine of claim 1, wherein said input/output controller is configured to translate a main game processor control code from said main game processor into a code compatible with and for transmission to said device.

5. The machine of claim 1, wherein said device is connected to said input/output controller through a communication interface.

6. The machine of claim 5, wherein said device is connected to said input/output controller through a standard communication interface.

7. The machine of claim 6, wherein said device connected to said input/output controller through a standard communication interface selected from a group consisting of a Universal Serial Bus (USB), Industry Standard Architecture (ISA) Bus, or Firewire.

8. The machine of claim 1, wherein said device is selected from a group consisting of lights, control buttons, displays, coin acceptor, bill acceptor, bill validator, coupon dispenser and an additional input/output controller.

9. The machine of claim 1, wherein said controller includes a non-volatile data store storing secure data.

10. The machine of claim 9, wherein said main game processor is configured to include data corresponding to instructions to access said data store.

11. A gaming device comprising:

a main game processor configured for carrying out game instructions;

a game play interface;

an input/output controller including a communication link with the main game processor, said interface in communication with the controller, said controller configured to enable communication between said interface and said main game processor over said link, wherein said controller provides an abstraction of attributes and commands for control of said interface, said abstraction allowing said main game processor to communicate with said interface via said input/output controller while being isolated from variations in interface configuration, said abstraction applying to both a hardware arrangement for said game play interface and a protocol of communicating with said game play interface, wherein said input/output controller unloads at least a portion of control of said game play interface from said main game processor to reduce a load on said main game processor.

12. The device of claim 11, wherein said interface includes interface code and said input/output controller is configured to translate the code of the interface into a control code to be transmiffed to and received by said main game processor.

13. The device of claim 11, wherein said input/output controller is configured to translate a main game processor control code from said main game processor into a code compatible with and for transmission to said interface.

14. The device of claim 11, wherein said game play interface is connected to said input/output controller through a standard commumcation interface.

15. The device of claim 14, wherein said game play interface is connected to said input/output controller through a standard communication interface selected from a group consisting of a Universal Serial Bus (USB), Industry Standard Architecture (ISA) Bus, or Firewire.

16. The device of claim 11, wherein said interface is selected from a group consisting of lights, game play buttons, display, coin acceptor, bill acceptor, bill validator, coupon dispenser and a secondary communication line.

17. A method for providing communication between a game play interface and a gaming machine processor for operation of features of a gaming machine comprising:

configuring a main game processor for carrying out game instructions;

providing an input/output controller communicating with the main game processor;

connecting at least one device adapted to interface with the main game processor to the controller and configuring the controller to enable communication between said at least one device and said main game processor, wherein said controller provides an abstraction of attributes and commands for control of said at least one device, said abstraction allowing said main game processor to communicate with said at least one device via said input/output controller while being isolated from variations in configuration for each of said at least one device, said abstraction applying to both a hardware arrangement for each of said at least one device and a protocol of communicating with each of said at least one device, wherein said input/output controller unloads at least a portion of control of said at least one device from said main game processor to reduce a load on said main game processor.

18. An input/output controller for a gaming machine of the type including a main game processor configured for carrying out game play instructions and a device to be in communication with the main game processor, said controller comprising:

a first connection for placing said controller in communication with said game processor and a second connection, said device connected to said second connection;

a processing unit configured to enable communication between said game processor and said device, wherein said processing unit provides an abstraction of attributes and commands for control of said device, said abstraction allowing said main game processor to communicate with said device via said input/output controller while being isolated from variations in device configuration, said abstraction applying to both a hardware arrangement for said device and a protocol of communicating with said device, wherein said input/output controller unloads at least a portion of control of said device from said main game processor to reduce a load on said main game processor.

19. The controller of claim 18, further comprising a non-volatile data store storing secure data.

20. The controller of claim 19, wherein said controller includes a non-volatile data store storing secure data.

21. The controller of claim 18, further comprising a standard communications interface for connection of said device.

22. The controller of claim 21, wherein said standard communications interface is selected from a group consisting of a Universal Serial Bus (USB), Industry Standard Architecture (ISA) Bus, or Firewire.

* * * * *